United States Patent [19]

Seppo

[11] 4,450,726
[45] May 29, 1984

[54] FLOW-OPERATED MEASURING APPARATUS

[76] Inventor: Seppanen Seppo, Itaranta 13 E, 02100 Espoo 10, Finland

[21] Appl. No.: 342,000
[22] PCT Filed: May 18, 1981
[86] PCT No.: PCT/FI81/00034
  § 371 Date: Jan. 6, 1982
  § 102(e) Date: Jan. 6, 1982
[87] PCT Pub. No.: WO81/03378
  PCT Pub. Date: Nov. 26, 1981

[30] Foreign Application Priority Data

May 16, 1980 [FI] Finland ................................. 801589

[51] Int. Cl.³ .......................... G01F 1/82; G01N 17/06
[52] U.S. Cl. ............................... 73/861.35; 73/861.83; 374/39
[58] Field of Search ........... 73/861.33, 861.35, 861.83, 73/203; 374/39

[56] References Cited

U.S. PATENT DOCUMENTS

| | | | |
|---|---|---|---|
| 2,620,659 | 12/1952 | Karcz | 374/39 |
| 3,308,662 | 3/1967 | Maurer | 73/203 |
| 3,439,538 | 9/1969 | Farrell | 73/861.83 |
| 3,440,877 | 4/1969 | Kovats | 73/861.83 |

FOREIGN PATENT DOCUMENTS 2716787 10/1977 Fed. Rep. of Germany ........ 374/39

*Primary Examiner*—Herbert Goldstein
*Attorney, Agent, or Firm*—McGlew and Tuttle

[57] ABSTRACT

A measuring apparatus is disclosed which is operated by the flowing of a medium. The apparatus comprises a rotor fitted coaxially within a flow pipe, a tachometer of the rotor and a flow guide member comprising a director and a controller. By means of these members the flow can be divided, according to the message received from a sensing element, into two components, of which at least one is screw-shaped or spiralling. By employing such a guide member the rotor is easily started, and its rotating speed is directly comparable to the quantity to be measured, as well as to volume flow. The sensing element can be for example a spiral-shaped bimetallic member reacting to changes in the flow temperature, the member being attached at its one end to the flow pipe and at its other end to the director. According to changes in the temperature the sensing element revolves around the director with respect to the controller, and the mutual proportion of the flow components is changed, as well as the rotating speed of the rotor.

10 Claims, 10 Drawing Figures

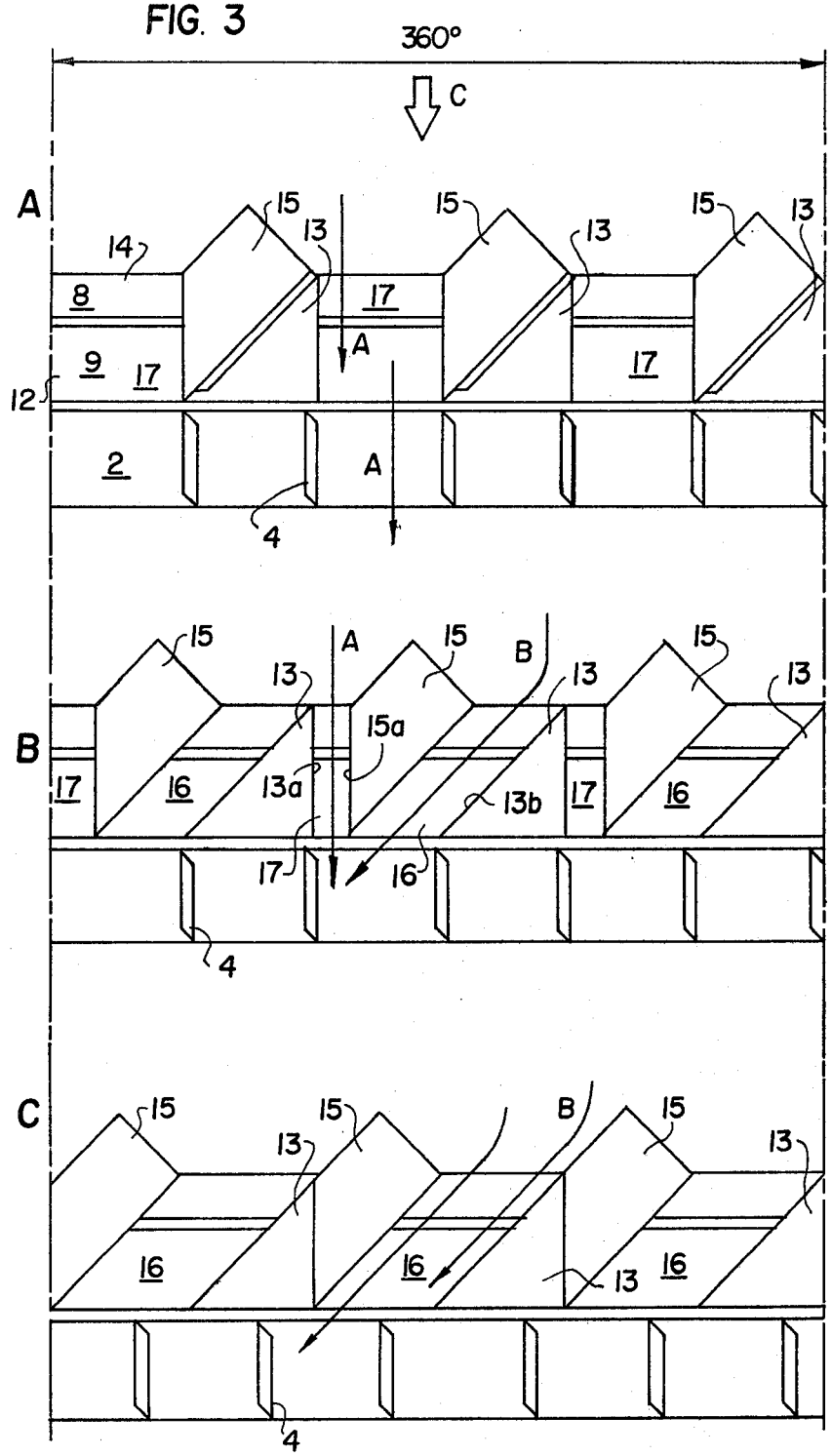

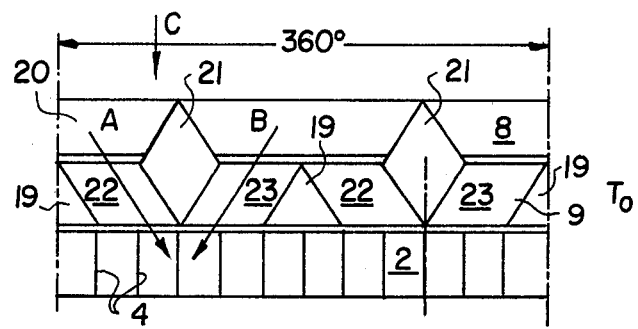
FIG. 4A
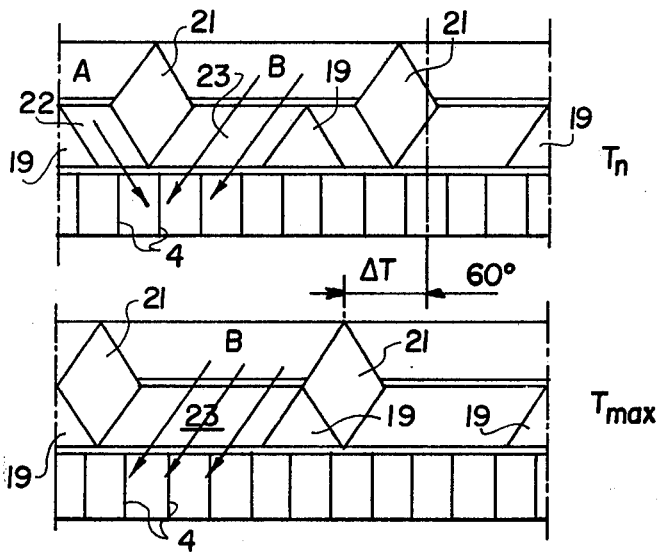
FIG. 4B
FIG. 4C
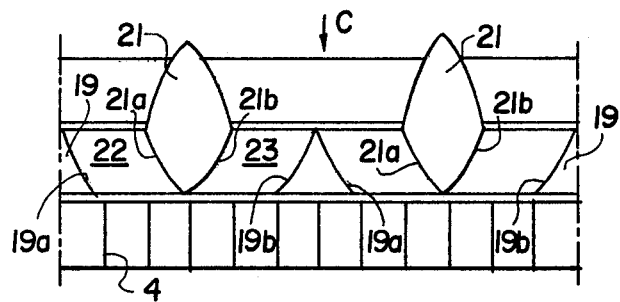
FIG. 5
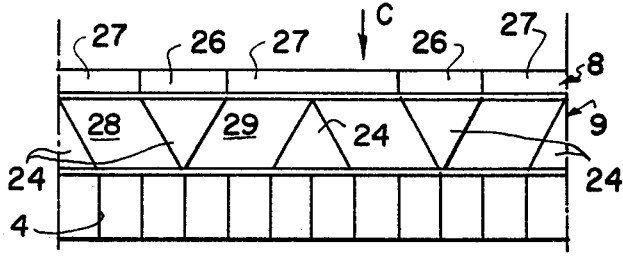
FIG. 6

FLOW-OPERATED MEASURING APPARATUS

FIELD AND BACKGROUND OF THE INVENTION

The present invention relates to a measuring apparatus, the operation whereof is based on the flowing of fluid, gas or other such medium, the apparatus comprising a flow pipe, a rotor placed coaxially therein, a rotor tachometer or equivalent member, and means for guiding the flow, there means being located before the rotor in the principal flowing direction.

The measuring apparatus of the invention is meant to be employed for measuring one or several parameters of the medium substance, such as volume flow, mass flow, content, composition or other similar conditions.

In the prior art meters are known for measuring various types of flow. Such meters comprise a rotor fitted coaxially within the flow pipe, and a control blade arrangement positioned fixedly in front of the rotor. The blade arrangement deviates the flow from the principal flowing direction. By means of the control blade arrangement, the directly proceeding flow receives a screw-shaped speed component which, in its turn, rotates the rotor. The rotating speed of the rotor is counted by a tachometer or revmeter, and from the reading of the revmeter the flowing speed and further the volume flow can be calculated or read directly by means of a suitable electronic calculator. Other quantities depending from the characteristics of the flowing medium cannot be directly measured.

In the German Patent Applications nos. DE-OS 1 931 498 and DE-OS 2 010 390 heat amount meters are presented where the liquid flows through a turbine provided within the flow pipe. The changes in the liquid temperature suitably affect the turbine blades which are made of bi-metal, by changing the angle of these blades. Consequently the change in the temperature also causes a change in the geometry of the blades, and further in the rotating speed of the turbine.

One of the drawbacks of the above described meters is the relatively heavy structure of the turbine. Moreover, it is in practice diffficult to make such turbines react with desired accuracy to the changes in the temperature. The measuring apparatus of this type cannot be employed for measuring quantities other than heat amount.

Another drawback of the above described apparatus is the fact that the slanted position of the turbine blades directs to the turbine, a remarkably great axial power component resulting from the flow, and this power component has to be received by means of bearings. This reduces both the sensitivity and the lifetime of the apparatus.

In the published Finnish Patent Application no. 793299 a heat amount meter is presented where the turbine or the rotor and the bimetallic guide member reacting to changes in the temperature, are constructed separately, in which case some of the drawbacks of the above described German Patent Applications can be avoided. However, the manufacturing of the control blade arrangement of bimetal is arduous and its sensitivity leaves room for criticism.

SUMMARY OF THE INVENTION

The purpose of the present invention is, among other things, to eliminate the above mentioned drawbacks and to realize a flow-operated measuring apparatus which is appropriate for measuring various liquid and gasiform medium substances. This is achieved by means of the characteristic features of the invention. Accordingly an object of the invention is to provide a measuring device which comprises a flow conduit for passing a flowing medium in a flow direction, a rotor rotatably mounted in the flow conduit shaped to rotate with medium flowing at an angle to the flow direction, rotation counting means associated with the rotor for counting the rotations of the rotor, a director having at least one member extending into the medium flow with downstream lateral side surfaces, a controller having at least one member extending in the medium flow with upstream lateral surfaces, the director and collector mounted for relative rotation therebetween, defining at least two paths between respective lateral side surfaces thereof which change in cross-section with changing relative rotational positions of the director and collector to vary the medium flow from a flow parallel to the medium direction to a flow extending at an angle to the flow direction, and quality measuring means which change in shape with the change in a measured quality of the flowing medium, said quality measuring means connected to one of said director and collector for changing the relative rotational position of said director and collector to change the cross-sectional area of said at least two flow paths and cause a selected amount of rotation on said rotor which is measured by said rotation counting means to give a measure of the quality.

Among the most important advantages of the present invention are its simple and reliable operational structure and low manufacturing costs. The dividing of the guide member to a director and a controller, particularly when combined with other features of the invention, ensures that the rotor is sensitive enough to start rotating and that its rotating speed is directly comparable to the quantity to be measured—such as temperature or volume flow.

Depending on the sensing element used in the measuring apparatus, the measuring of the desired characteristic of the flowing fluid can be transformed into measuring the rotating speed of the rotor, and further suitably manipulated. By changing the sensing element, the measuring apparatus can be modified, while the basic structure remains the same.

In the following the invention is explained in detail with reference to the appended drawings, mainly in relation to a measuring apparatus for measuring heat amount.

BRIEF DESCRIPTION OF THE DRAWINGS

In the Drawings

FIG. 5 is an illustration of an advantageous modification of the apparatus of FIG. 4; and FIG. 6 is a schematic illustration of a third embodiment of the director and the controller.

DETAILED DESCRIPTION OF PREFERRED EMBODIMENT

Figure 1:
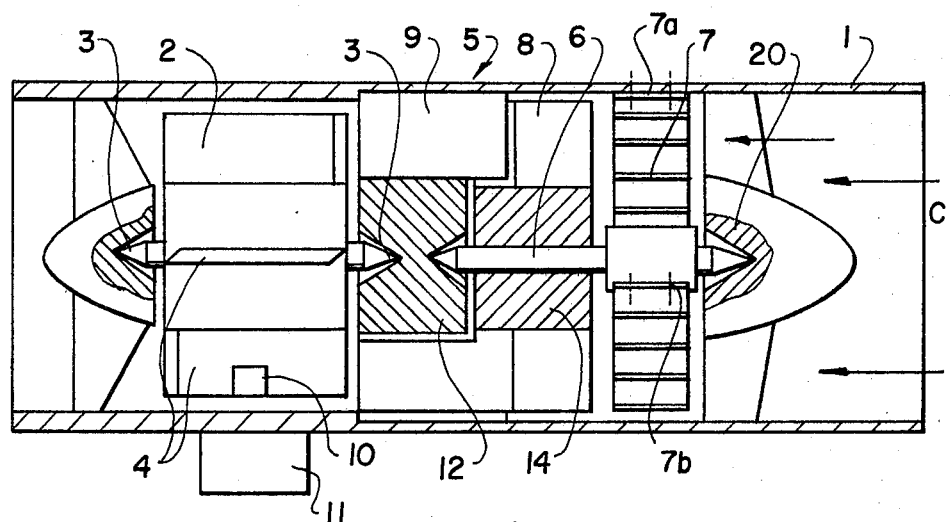
FIG. 1 is a schematic illustration of one preferred embodiment of the invention in longitudinal cross-sectional view.
Figure 2:
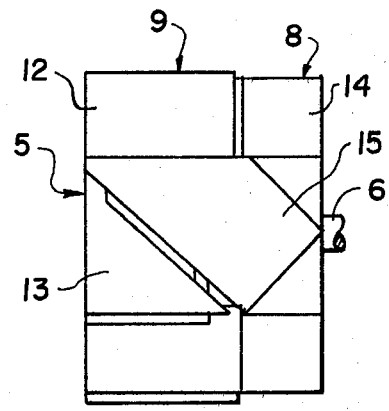
FIG. 2 is an illustration in side elevation, of the director and the controller of the apparatus of FIG. 1, FIGS. 3A to 3C are schematic illustration of the director and the controller and of their operation, FIGS. 4A to 4C composite schematic illustration of another embodiment of the director and the controller and of their operation.

In FIGS. 1 and 2 a preferred embodiment of the invention is presented. According to FIG. 1 the meter comprises the flow pipe 1, wherein is placed a coaxially positioned rotor 2 resting on bearings 3. The blades 4 of the rotor 2 are parallel to the rotor axis and to the principal flowing direction C of the medium. Immediately in front of the rotor 2 in the flowing direction C is located a guide member generally designated 5, which is separately illustrated in FIG. 2. The guide member 5 contains two interrevolving parts, the director 8 and the controller 9.

The director 8 and a sensing element 7, which in this case is a spiralled member made of bimetal, are fixedly connected on the same axle 6, which axle is positioned coaxially with bearings at its ends between the controller 9 and the auxiliary center 20. One end 7a of the sensing element 7 is attached to the flow pipe 1 for example by riveting and the other end 7b is attached to the axle 6.

When the temperature of the flowing medium conforms to to comparison level, the guide member 5 is in the position shown in FIG. 2 (or FIG. 3A). In this position the director 8 and the controller 9 of the guide member 5 are aligned or attached to each other, and the flow proceeds directly in the principal flowing direction, symmetrically around the guide member 5. Hence the rotor 2 does not rotate. As the temperature of the medium substance increases, the bimetallic sensing element 7 registers the increase and starts to revolve around the director 8 by means of the axle 6. As a result of this, the slanted channels 16 (FIG. 3B) located between the director 8 and the controller 9 are opened and the medium substance receives an inclined, in other words spiralling or screw-shaped motion component. This component starts rotating the rotor 2. The amount of rotation cycles is counted for instance by means of the magnet 10 fitted in the blade 4 of the rotor, a reed-type relay and the electronic counter 11. Channels 16 are defined between lateral side surfaces of the director 8 and controller 9, as shown in FIGS. 3A to 3C.

The structure and operation of the guide member 5 are presented in more detail in FIG. 3, where the cylindrical member is spread out in a plane in order to better illustrate its operation. As previously stated, the guide member 5 consists of two parts: the director 8 and the controller 9, which parts are coaxially installed within the flow pipe 1 and interrotatable according to the message received from the sensing element 7. In this particular embodiment the parts 8, 9 of the guide member 5 can be rotated by 60° with respect to each other. The position of the director 8 and the controller 9 is defined through a suitable intermediate gear according to the message given by the sensing element 7.

The controller 9 consists of two or more (FIGS. 3A to 3C) members 13 connected to the center 12, the members being preferably triangular in cross-section, and having a sharp angle or equivalent against the principal flowing direction C. Respectively the director 8 is combined of two or more (in FIG. 3 of three) members 15, like the members 13 of the controller 9, connected to the center 14, the two lateral side surfaces 15a and 15b of the said members 15 being parallel to the lateral side surfaces 13a and 13b of the controller and matching their shape. The centers 12 and 14 of the controller 9 and the director 8 are fitted successively and adjacently within the flow pipe 1 so that the members 13 and 15 are arranged in an interlocking fashion, and between them are formed the flow channels 16 and 17. Members 15 of director 8 are polygonal as shown.

FIG. 3A illustrates a situation where the channels 17, parallel to the principal flowing direction C, are open, and therefore only the flowing component A is effective. In the situation of FIG. 3B the channel 16 has been opened, the flowing component B is effective and the rotor rotates. The magnitude of the flowing component B is comparable to the cross-section area of the opened channel. Consequently the rotating speed of the rotor 2 is comparable to the angle shift between the director 8 and the controller 9. In FIG. 3C the channel 17 of the flowing component is closed. The whole flow C is conducted through the channel 16 which rotates to rotor 2.

It is pointed out that the combined cross-section area of the channels 16 and 17 remains constant irrespective of the angle change between the director 8 and the controller 9. Thus the total flow also remains constant. Hence the flow causes only the measuring device to operate. The rotating speed of the rotor 2 is finally determined according to the message received from the sensing element 7.

In the particular embodiment of the guide element 5 presented in FIGS. 4 and 5, the members 19 connected to the center 18 of the controller 9 are in cross-section equilateral triangles, their later side surfaces 19a and 19b being preferably arched inwards (FIG. 5). Thus the flow can be guided efficiently and practically without turbulence. The members 21 connected to the center 20 of the director 8 are at their lateral side surfaces 21a and 21b matched to the surfaces 19a and 19b of the controller 9. Hence the surfaces 21a and 21b are preferably arched outwards (FIG. 5). The part of the member 21 which is located in the principal flowing direction has generally a sharp-angled cross-section. In cross-section the member 21 can, as illustrated in FIG. 4 and 5, be a diamond or an equilateral parallelogram, the sharp angles whereof located in the principal flowing direction.

FIG. 4 illustrates respective situations as in FIG. 3. With the director 8 and the controller 9 in their 4A position, in other words, in their normal positions at temperature T, the blades 4 of the rotor 2 receive equivalent flow on both sides, through the channels 22, 23 having equal cross-section areas, and thus the rotor does not rotate. At the temperature $T_n$ (FIG. 4B) the temperature sensing element has deviated the director 8, and consequently the members 21, off their symmetrical central position, and the cross-section area of the channel 23 has increased while the cross-section area of the channel 22 has decreased. As in the case of FIG. 3, the rotating speed of the rotor 3 is comparable to the angle shift between the director 8 and the controller 9. In the temperature $T_{max}$ (FIG. 4C), the director 8 is in its extreme position, wound to an angle of 60°, and the other flow channel 22 is closed.

It is to be noted that in the embodiment of FIG. 4 the rotating speed of the rotor 2 is directly comparable to the changes in volume flow and in the message given by the sensing element, in this case to the temperature of the flow registered by the temperature-sensing element.

The controller 9 can also be constructed, as is shown in FIG. 6, of two or more pairs of members 24 connected to the center 25, the members being preferably triangular in cross-section and arranged in such a fashion that the sharp edge of every second member is directed against the principal flowing direction C, and the edges of the rest are directed parallel to the principal flowing direction. The director 8 consists of two or more plane-shaped or similar members 26, connected to the center 27, by means of which members it is possible to regulate the proportion between the flows of the adjacent channels 28, 29, according to the message received from the sensing element. The member 26 of the director 8 can also be triangular in cross-section, with its peak against the principal flowing direction C.

In the examples above the blades 4 of the rotor 2 are generally parallel to the rotor axis. By deviating the blades off this direction it is possible to regulate the direction and the magnitude of the axial friction of the rotor.

The director or the controller of the measuring apparatus can be fixedly installed within the flow pipe. On the other hand, it is possible to connect a sensing element to both and then arrange the two parts of the guide member in an interrotating fashion. Thus it is possible to measure for example heat consumption in a particular location by measuring the temperature differences between the input and the output flow.

In the above, the invention has been explained with reference to a few preferred embodiments only. It is naturally clear that the scope of the invention is by no means limited to include only the examples mentioned above. Various modifications in the structure of the measuring apparatus according to the invention are possible without deviating from the original inventive idea. For example, the cross-sections of the director and the controller of the guide member are determined mainly according to the laws of hydrodynamics, because in the case of the members it is desirable to achieve a minimum flowing resistance. The sensing element can be chosen separately for each particular measuring occasion. Thus it can be for example a sensing element detecting content, composition or pressure. Best suited for this invention are such sensing elements which change their shape by effect of the quantity to be measured.

I claim:

1. A measuring apparatus for measuring a parameter of a flowing liquid, gas or other such medium, said apparatus comprising:

a flow pipe (1); a rotor (2) fitted coaxially in said pipe for rotation; a remeter (10,11) connected to said rotor for measuring rotation thereof; a flow guide member (5) located upstream of said rotor in the principle flowing direction for varying a flow amount directed at an angle to said rotor to vary a rotational speed of said rotor; an actuator located upstream of said flow guide member which actuator is connected to said flow guide member; and a sensing element (7) for sensing the parameter, disposed in said actuator; characterized in that said guide member (5) consists of a director (8) and a controller (9) which are installed in succession within the flow pipe (1) in the flowing direction and which are interrotatable in a plane perpendicular to the principle flowing direction and which director (8) and controller (9) comprises support members (12,14;18,20;25,27) and at least two blade-like members (13,15;19,21;24,26) which are engaged in one of succession and an interlocking fashion and which members (13,15;19,21;24,26) form between them at least two divergent flow channels, the mutual proportion of the crosssection thereof being dependent on the mutual rotation of the director (8) and the controller (9) which rotation takes place according to a measurement from said sensing element (7) which acts upon said actuator to cause rotation of one of said director and controller and which varies said flow amount.

2. A measuring device for measuring a parameter of flowing medium comprising:

a flow conduit for passing the flowing medium in a flow direction;

a rotor rotatably mounted in the flow conduit shaped to rotate with medium flow flowing at an angle to the flow direction;

rotation counting means associated with said rotor for counting rotations of said rotor;

a director having at least one member extending into the medium flow with a downstream portion having lateral side surfaces;

a controller having at least one member extending in the medium flow with upstream portions having lateral side surfaces;

said director and controller mounted for relative rotation therebetween and upstream of said rotor in said flow direction for defining between said lateral surfaces thereof, at least two flow paths which are variable in cross-sectional area with relative rotation between said director and controller, at least one relative rotational position of said director and controller producing flow paths which cause medium flow only in the flow direction, rotation of one of said director and controller out of said one position causing increasingly medium flow at an angle to the flow direction up to a selected amount; and parameter sensing means sensitive to the parameter to be measured in the medium connected to at least one of said director and controller for changing the relative rotational position of said director and controller with a change in the parameter to produce a change in an amount of rotation of said rotor, which amount corresponds to the parameter.

3. A measuring device according to claim 2, wherein said controller includes at least two of said members having a triangular cross-section in the flow direction with an apex angle facing upstream of said flow director, said director having at least two of said members which are polygonal in cross-section with respect to said flow direction, facing side walls for carrying said lateral side surfaces of said director and controller members extending substantially parallel to each other and defining said flow paths therebetween.

4. A measuring device according to claim 3, where one side wall of each director and controller member extends parallel to said flow direction with the other side wall of each respective director and controller member extending at an angle to said flow direction.

5. A measuring device according to claim 3, wherein said side walls of the director and controller members extend at equal opposite angles to said flow direction.

6. A measuring device according to claim 5, wherein each of said director and controller side walls is one of concave and convex in shape so that facing side walls of said director and collector respectively are substantially the same in contour.

7. A measuring device according to claim 5, wherein each of said director members is substantially diamond shaped in cross-section with respect to said flow direction with downstream portions having said triangular cross section and upstream portions also having a triangular cross-section with respect to said flow direction.

8. A measuring device according to claim 7, wherein side walls of said diamond shaped director members are convex, side walls of said controller members concave, said at least one relative rotational position of said director and controller being where said controller members are equidistantly located between adjacent director members.

9. A device according to claim 2, including a shaft rotatably mounted in said flow conduit on an axis extending parallel to said flow direction, said director fixed to said shaft, said parameter sensing means comprising an element which changes shape with change in the flow parameter having one end connected to said flow conduit and an opposite end connected to said shaft for rotating said shaft with change in said parameter to rotate said director.

10. A device according to claim 9, wherein said parameter sensing means comprises a spirally wound bimetal member wound about said shaft having one end connected to said shaft and an opposite end connected to said flow conduit.

* * * * *